United States Patent [19]

English, Jr.

[11] 4,229,846
[45] Oct. 28, 1980

[54] WATER-SAVING FLOAT-TO-INLET VALVE ADAPTER DEVICE

[76] Inventor: Edgar English, Jr., 45125 Redwood Ave., Lancaster, Calif. 93534

[21] Appl. No.: 69,832

[22] Filed: Aug. 27, 1979

[51] Int. Cl.³ ............................................. E03D 1/35
[52] U.S. Cl. ......................................... 4/396; 4/395
[58] Field of Search .................... 4/396, 325, 366, 395

[56] References Cited

U.S. PATENT DOCUMENTS

| | | | |
|---|---|---|---|
| 1,972,331 | 9/1934 | Dean | 137/426 |
| 2,654,362 | 10/1953 | Scharf | 137/426 X |
| 2,724,838 | 11/1955 | Wirth et al. | 4/325 |
| 2,847,026 | 8/1958 | Nelson | 4/396 X |
| 3,310,065 | 3/1967 | Godshalf | 137/426 X |
| 3,331,387 | 7/1967 | Walters | 137/426 |
| 3,385,317 | 5/1968 | Yankers | 137/426 |
| 3,421,161 | 1/1969 | Stafford et al. | 4/325 |

Primary Examiner—Henry K. Artis

[57] ABSTRACT

A water-saving float-to-inlet valve adapter device or modifier which may comprise original equipment or a replacement for a conventional substantially transversely directed attachment arm conventionally provided and connecting a buoyant float and an inlet valve into a toilet flush tank, with the modifier or adapter functioning to effectively modify the normal position of such a buoyant float, and correspondingly the normal maximum height of the water level in the flush tank at the end of each refilling operation, when the adapter effectively causes the inlet refilling valve to be turned off, whereby to in effect greatly reduce the amount of water contained in the toilet flush tank at the end of a refilling operation following each flushing operation and consequently reducing the amount of water utilized in each flushing operation, which in one preferred form, is selectively adjustable.

12 Claims, 8 Drawing Figures

U.S. Patent    Oct. 28, 1980    4,229,846
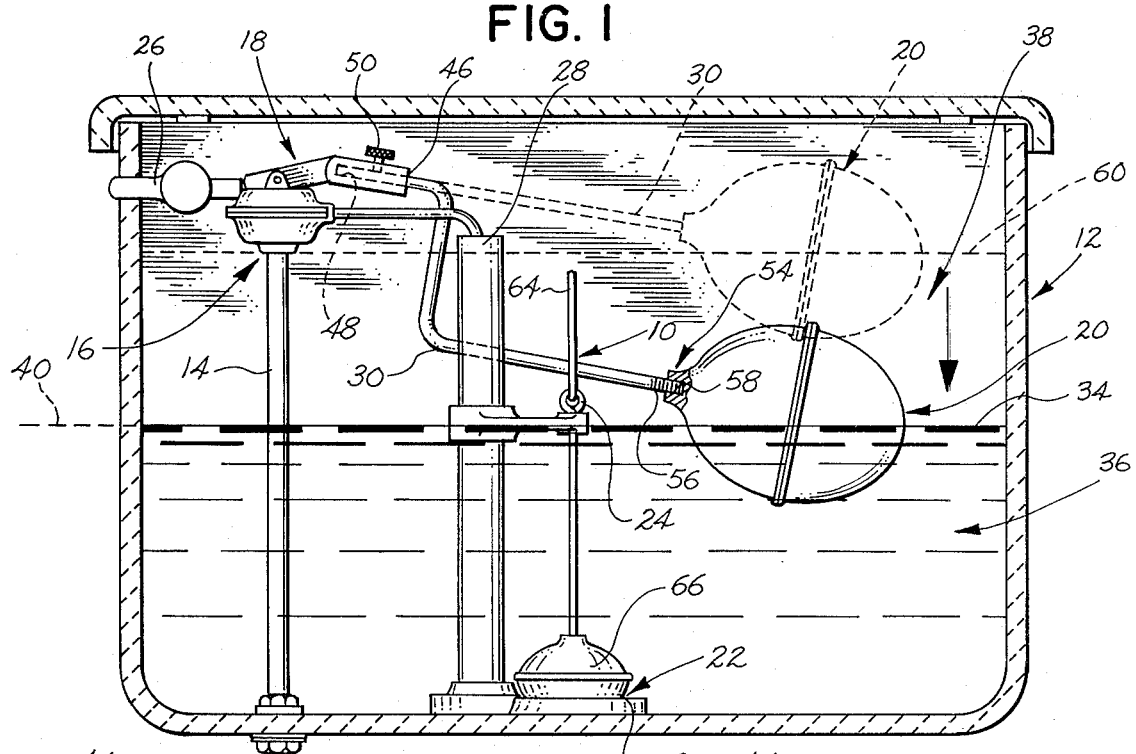
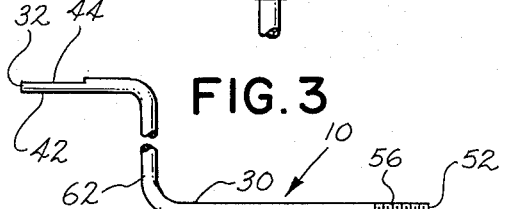
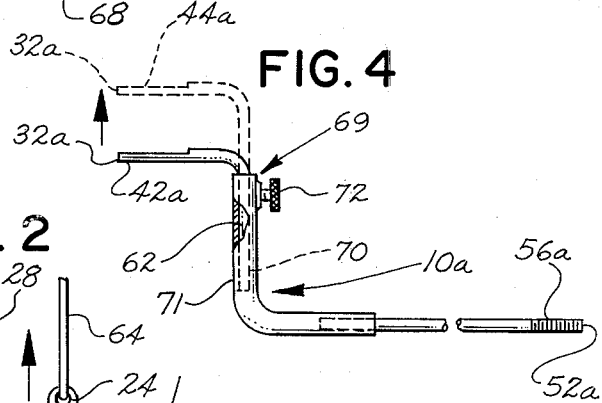
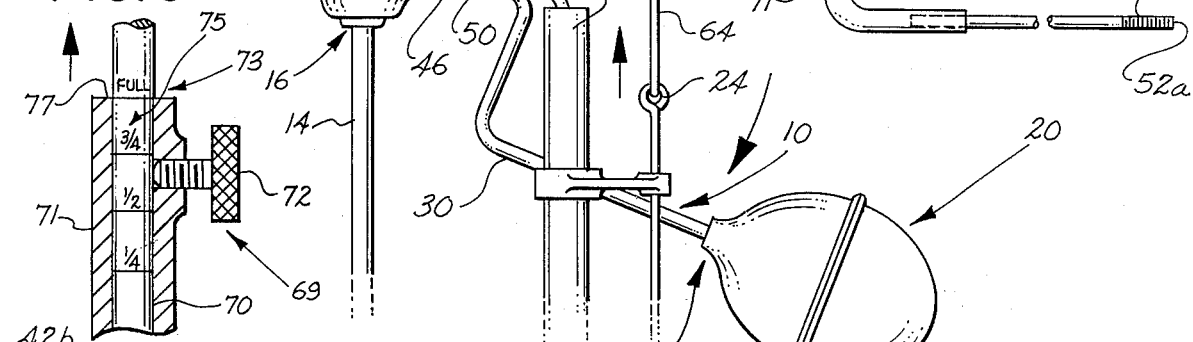
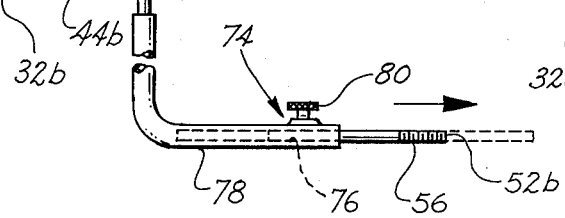
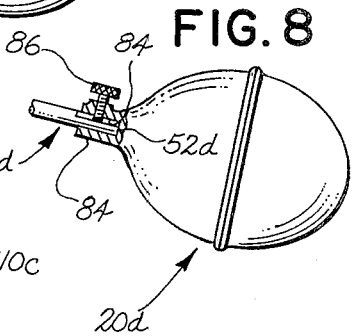

WATER-SAVING FLOAT-TO-INLET VALVE ADAPTER DEVICE

BACKGROUND OF THE INVENTION

The field of the invention is generally that of toilets and, more particularly, that type of toilet which has a flush tank positioned above the level of a toilet bowl and which is adapted to normally be refilled after each flushing operation to a predetermined level and to then be abruptly released during a flushing operation, in response to the operation of a flush lever or handle, so that the entire quantity of water in the flush tank is then abruptly discharged, under the influence of gravity through a large discharge valve and into the toilet bowl for effectively flushing it out. This prior art type of toilet discharges a very large quantity of water during each such flushing operation, and in the light of ever-increasing awareness of the necessity of conserving water, particularly in certain relatively dry or drought-stricken areas, it would be a vast improvement if a smaller quantity (preferably selectively adjustable) of water could be discharged during each flushing operation. The conventional toilet flush tank defines an interior chamber of substantial volume, and there are large numbers of such relatively expensive pieces of equipment already in the field, which would be very expensive to replace with flush tanks of smaller volumetric capacity. The desirable thing would be to provide some way of making it possible to reduce the volume of water discharged during each flushing operation while using the pre-existing, relatively large flush tanks which are already installed in millions of homes and buildings. While means for controlling the main discharge valve might accomplish this, all such arrangements which have been developed to date are arrangements which partition off portions of a tank so that only a part of the tank will be emptied during a flushing operation, and they require relatively complicated and expensive equipment and have certain operational disadvantages, including installation problems, adaptability problems with respect to the installation of same in various different sizes and types of pre-existing flush tanks, and the maintenance problems. It is clear that it would be highly desirable to provide a simple, virtually maintenance-free and relatively inexpensive means for providing for a reduced volume (in certain forms, selectively adjustably reduced volume) of water discharged during a flushing operation, which would have none of the above-mentioned prior art disadvantages and yet would be efficient, effective and adaptable to a great variety of types and sizes of pre-existing flush tanks. It is precisely such a highly desirable and advantageous type of simple, inexpensive, easy-to-install and virtually universally adaptable device for use with either newly manufactured flush tanks or with the vast number of pre-existing flush tanks, which have been manufactured and are now in use, which is provided by and in the present invention, and which has advantages completely overcoming the above-mentioned problems, disadvantages and limitations of prior art constructions intended for the same purpose, and all of which advantages flow from and occur by reason of the specific features of the invention pointed out hereinafter.

SUMMARY OF THE INVENTION

Generally speaking, the water-saving float-to-inlet valve adapter device of the present invention comprises a modified attachment arm adapter, which may be a replacement adapter for replacing a conventional, pre-existing, normally substantially transversely directed float-to-inlet valve attachment arm of a prior art toilet mechanism or which may be provided as original equipment in such a toilet-operating mechanism, with the adapter having a first end adapted to be attached in any suitable manner with respect to an inlet valve opening and closing operating member (which, in certain cases, may be a conventionally provided receiver type of operating member, although not specifically so limited) and with the adapter having a second end remote from said first end and substantially downwardly displaced from the level of said first end and adapted to be attached to a conventional buoyant toilet tank float member at a normal filled-tank water level substantially below that of the normal prior art location of such a buoyant toilet tank float member when in a filled-tank water level location substantially above that provided by reason of the downward displacement of the second end of the adapter of the present invention. The downward displacement of the second end of the adapter may be said to effectively relatively downwardly displace the normal vertical position of such a hollow buoyant float member corresponding to the closing of the inlet valve and, thus, causes a toilet flush tank to only partially refill to a substantially lower refilled level than has been the customary practice with a conventional attachment arm interconnecting the inlet valve opening and closing operator member and such a buoyant float member.

In one preferred form of the invention, the effective downward displacement of the second end of the adapter relative to the first end thereof, is provided by an intermediate, downwardly offset portion of the adapter, which effectively displaces the entire second end correspondingly downwardly from the entire first end thereof by an amount determined by the magnitude of the intermediate downwardly offset portion which, as referred to hereinafter in greater detail, may, in certain cases, be provided with manually operable controllable adjustment means for making it possible to adjust the magnitude of the downward displacement of the second end of the adapter relative to the first end thereof and to correspondingly make it possible to adjust the refilling water level of a toilet flush tank to any desired level below the conventional prior art level thereof.

The attachment of the first and second ends of the adapter relative to the operating member of the inlet valve and relative to the buoyant float member respectively, may be made possible through the provision of, and the use of, any of a variety of different types of attachment means, certain of which have been employed in similar situations in prior art toilet flush controlling mechanisms. However, one widely used arrangement is an arrangement where the inlet valve has a transversely directed operating member which closes the valve when it is moved upwardly to a predetermined extent and which opens the valve when it is moved downwardly to a predetermined extent. In such a prior art type of inlet valve operating member, a receiver or recess may be provided for receiving therein the corresponding first end of the adapter, which may then be fastened in place by a set screw, which can be threadedly advanced into firm locking engagement with an appropriate transverse surface of said first end of the adapter. This type of arrangement and another arrangement including threaded engagement means male-to-female or vice versa, with respect to the first end of the adapter and with respect to the inlet valve operating member are also intended to be included and comprehended within the scope of the invention as well as various substantially functionally equivalent constructions. The same may be said of the attachment of the remote second end of the adapter to a buoyant float member. This may be provided by a receiver and locking set screw arrangement or male-to-female or female-to-male threaded engagement structure similar to that just described in connection with the attachment of the first end relative to the inlet valve operating member, and all such arrangements (including substantially functionally equivalent arrangements) are intended to be included and comprehended within the scope of the present invention.

On one preferred form, the intermediate displacement portion of the adapter may comprise an offset portion which is substantially perpendicular with respect to a first portion attached to said first end and with respect to a second portion attached to said second end and, as previously mentioned, in one preferred form, said intermediate portion may be provided with manual adjustment means operable for controllably manually adjusting the effective length of the intermediate displacement portion and correspondingly adjusting the magnitude of the vertical displacement of said second end relative to said first end and to thus, in effect, modify the normal valve closing position of a buoyant float member attached to said second end, whereby to correspondingly similarly modify the normal water refilling level within a toilet flushing tank. This makes it possible to adjust the normal water refilling level within a flush tank to half of the usual height, to a third of the usual height or even to as little as one-quarter of the usual height, which is about a minimum level for providing an effective gravity-caused flushing operation when a main flushing discharge valve at the bottom of the flush tank is abruptly opened.

The manual adjustment means referred to above may preferably comprise two relatively vertically slidably engageable (in certain cases telescopically engageable) adjustment portions and locking means (in certain cases, locking means of the set screw type, although not specifically so limited) for controllably locking the two relatively vertically slidably engageable adjustment portions in any relatively adjusted position.

It is also possible that in certain forms of the invention where it is to be used in a flush tank of greatly different size from the usual—for example, in a flush tank of substantially different width than the usual flush tank width—it may be found that the adapter would not mount a buoyant float member in a convenient location for proper operation. It might be too close to some of the other mechanisms or too near to an opposite wall of a narrow flush tank. For the purpose of making the device universally adaptable for even widely variable flush tanks, one preferred form of the invention may provide the adapter with effectively longitudinally directed adjustment means for adjusting the relative longitudinal space between first and second ends of the adapter and for correspondingly adjusting the longitudinal space which would exist between an inlet valve and a buoyant float member when interconnected by such a longitudinally adjusted adapter. In one preferred form, the longitudinally directed adjustment means may comprise two slidably engageable (in certain instances telescopically slidably engageable) longitudinally relatively adjustable members provided with controllably operable locking means (such as set screw means or any other functionally equivalent thereof, although not specifically so limited in all forms of the invention) whereby to make it possible to properly adjust the positioning of a buoyant float member in a toilet flush tank irrespective of the width of the tank or of the interior location of the operating mechanism contained therein.

OBJECTS OF THE INVENTION

With the above points in mind, it is an object of the invention to provide a novel water-saving float-to-inlet valve adapter or modifier intended for use as a replacement in a pre-existing toilet flushing mechanism, or as original equipment in newly manufactured toilet flushing mechanisms, and which can be arranged to modify the water-refilling level of a toilet flush tank from an original, relatively high level to a substantially lower level in keeping with current water conservation policies and practices.

It is a further object of the invention to provide a novel water-saving adapter of the character referred to herein which is capable of being adjusted so as to correspondingly adjust the refilling water level of a toilet flush tank to any desired new refilling level.

It is a further object of the invention to provide a novel device of the character referred to herein, generically and/or specifically, and which may include any or all of the features referred to herein, either individually or in combination, and which is of an extremely easy-to-mount-and-dismount and easy-to-use construction, and which, further, is of extremely simple, inexpensive, easy-to-manufacture construction, suitable for ready mass manufacture, distribution of the water-saving adapter in any of its various forms at extremely low cost, both as to the initial capital cost (including production set-up cost) and as to the subsequent per-unit manufacturing cost, whereby to be conducive to widespread production, distribution and use of the novel water-saving adapter for the purposes outlined herein or for any substantially equivalent or similar purposes.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, several exemplary embodiments of the invention are illustrated in the hereinbelow-described figures of the accompanying single drawing sheet and are described in detail hereinafter.

BRIEF DESCRIPTION OF THE DRAWINGS

FIG. 1 is a front elevational view of one exemplary embodiment of the present invention in cooperative mounted relationship with respect to a conventional toilet flushing mechanism, which is also shown in front elevation, and a conventional toilet flush tank with the sides, bottom and cover thereof being shown in vertical section. This view illustrates in dashed lines the normal water refilling level of such a flush tank when equipped with such flushing mechanisms and a conventional float-to-inlet valve attachment arm, and illustrates in solid lines the new, very substantially lower, refilling water level when the apparatus is provided with the novel water-saving float-to-inlet valve adapter of the present invention.

FIG. 2 is a fragmentary, partially broken-away view of just certain operative portions of the toilet flushing mechanism of FIG. 1, with the novel water-saving float-to-inlet valve adapter of the present invention connected thereto and with all portions of the toilet flush tank and water normally contained therein removed for reasons of drawing simplicity, and with the adapter, the float at the second end thereof, and the inlet valve operating member at the first end thereof all in downwardly extreme inlet-valve-open relationship such as they assume when a toilet is flushed by the operation of the main discharge valve member upwardly away from the main discharge valve seat for flushing a connected toilet bowl (not shown).

FIG. 3 is a fragmentary, partially broken-away elevational view of the adapter of the present invention as shown in FIG. 1, but with a substantial intervening transverse portion broken-away and removed for drawing space-saving reasons. The adapter is shown by itself with the toilet tank and toilet flush mechanisms of FIG. 1 completely removed in order to clearly show that portion of the apparatus of FIG. 1 which primarily comprises the present invention.

FIG. 4 is a fragmentary, partially broken-away elevational view of a slightly modified form of the adapter of the present invention and is generally similar in aspect to FIG. 3, except for the modification of the intermediate downwardly directed offset portion, which in this modification includes manual adjustment means for controllably, manually adjusting the degree of offset relationship which will exist between transversely spaced first and second ends of the adapter and thus, to correspondingly vertically adjust the water level which will normally be maintained in a toilet flush tank similar to that shown in FIG. 1.

FIG. 5 is a greatly enlarged fragmentary view, partly in elevation and partly in vertical section substantially along the plane and in the direction indicated by the arrows 5—5 of FIG. 4, and clearly illustrates one exemplary, representative but non-specifically limiting water volume selector and indicator means intended to represent a variety of functionally equivalent constructions capable of operating for the same water volume selecting and/or indicating purposes. In this view, the outer one of the two vertically, slideably, telescopically engaging adjustment members is shown broken away and in vertical section, while the other inner one of said two vertically, slideably, telescopically engaging adjustment members is shown in elevation so the visibly perceptible scale means carried thereby may be readily seen.

FIG. 6 is a fragmentary view similar in many respects to FIG. 3, but illustrating a further slight modification wherein some part of the two transversely directed portions (in this case a second part adjacent to a second end) is made transversely adjustable as to the length between first and second ends by the inclusion of manually controllable adjustment means, to make it possible to manually adjust and readily control the effective transverse spacing between the first and second ends of the adapter for use in providing the optimum cooperative relationship thereof with respect to toilet flush tanks of different widths and/or also wherein the interior flushing mechanism may be differently positioned. This transverse length adjustment is for the purpose of properly locating the buoyant float member so that it will neither strike the flush tank wall nor interfere with any of the interior flushing mechanisms in various different types and/or sizes of toilet flush tanks and/or mechanisms.

FIG. 7 is a fragmentary view illustrating a further slight modification of the first end of the novel adapter of the present invention for convenient attachment to a slightly different type of a modified inlet valve.

FIG. 8 is a fragmentary elevational view illustrating a slightly different type of second end of the adapter of the present invention arranged for convenient attachment, in a slightly different manner, to a modified attachment structure of a buoyant float member.

DESCRIPTION OF THE PREFERRED EMBODIMENTS

The exemplary first form of the water-saving float-to-inlet valve adapted of the present invention is illustrated in FIG. 1 and is generally designated by the reference numeral 10. It is shown in cooperative mounted association with, and relationship with respect to, one representative, but non-specifically limiting type of conventional toilet flush tank, such as is indicated generally at 12, and with respect to one representative type of conventional toilet flushing mechanism, comprising a conventional inlet pipe 14 adapted to be connected to a source of water under pressure and provided at its upper end with a conventional inlet valve, indicated generally at 16, operable by a substantially transversely directed operating member 18 between opened and closed condition; and further comprising a buoyant float member, such as is indicated generally at 20, which is adapted to normally be connected to the valve operating member 18 by a substantially transversely directed attachment arm (shown in broken lines in FIG. 1) and which is shown as having been replaced by the novel adaptor 10 of the present invention (shown in solid lines), and a main toilet flushing discharge valve, indicated generally at 22, adapted to be operated in an entirely conventional manner by an operating linkage (largely not shown since it is well-known in the art) connected between the member 24 and an externally positioned flushing handle 26. The conventional flushing mechanism also includes an overflow tube 28, and the entire arrangement is provided with appropriate anti-backsyphoning means (not shown in detail since such is well-known in the art.)

The novel adaptor 10 of the present invention is intended as a replacement for the conventional substantially transversely directed attachment arm which usually interconnects the inlet valve operating member 18 and the buoyant float member 20. In fact, the normal position of the float member 20 is shown in broken lines at a substantially higher level than the solid line showing thereof, as illustrated in FIG. 1, when the adaptor 10 of the present invention is in place. The conventional prior art, substantially transversely directed attachment arm is indicated in broken lines at 30.

The replacement adaptor 10 has a first end 32, which is adapted to be effectively attached to the inlet valve 16 in a manner such that upward movement of the buoyant float member 20 to a predetermined height, such as that indicated by the top surface 34 of the body of water indicated generally at 36, positioned within the bottom portion of the hollow, interior chamber 38 defined within the flush tank 12, will cause the closure of the inlet valve 16 and such that substantial downward movement of the buoyant float member 20 below its normal at-rest position as shown in FIG. 1 will move the inlet valve operating member 18 downwardly to an extent sufficient to cause the opening of the inlet valve 16, whereby to cause water to be fed into the hollow interior 38 of the flush tank 12 such as to cause refilling of the previously emptied flush tank 12 until a body of water 36 of the substantially the height shown in FIG. 1 having a top surface 34 at substantially the predetermined height indicated by the broken line 40, will be reached and maintained thereafter. It will be maintained thereafter because at that location the buoyant float member 20 will cause the inlet valve operating arm 18 to effectively close the inlet valve 16 and stop the flow of water into the interior 38 of the flush tank 12.

In the example illustrated, the first end 32 of the adaptor 10 is effectively provided with attachment means for attaching same to the inlet valve opening and closing operating member 18. In the form illustrated, this may comprise merely the end portion 42 thereof and a flatted or keyed surface 44 thereof, which is adapted to cooperate with a receiver member 46 carried by the inlet valve operating member 18 and merely comprising a corresponding aperture 48 extending thereinto and effectively provided with an attachment or fastening portion of said attachment means taking the form of a threaded set screw 50 threaded into a correspondingly tapped transverse aperture in the receiver member 46, whereby to extend into the receiver recess 48 and against the flatted surface 44 of the first end 42. All of said elements cooperate to effectively comprise said first attachment means for firmly locking said first end 32 of the adaptor 10 in firmly attached relationship to the operating member 18 of the inlet valve 16 for movement between the lower extreme valve-opened position, as shown in FIG. 2, and an upper valve-closed position, as shown in FIG. 1.

FIG. 2 illustrated fragmentarily and in somewhat reduced schematic and diagrammatic form the movement of the operating member 18 from the normally closed relationship shown in FIG. 1 into the open relationship mentioned above as a consequence of temporarily manually opening the main discharge and flushing valve 22, which lowers the water level and allows the buoyant float member 20 to correspondingly move downwardly.

The adaptor 10 has a downwardly displaced second end 52 remote from the first end 32 and adapted to be attached to a buoyant float member, such as the representative, but non-specifically limiting, form thereof shown at 20 in FIG. 1. In the example illustrated, the attachment of the second end 52 of the adaptor 10 to the buoyant float member 20 is made possible by the provision of a second attachment means, indicated generally at 54, for effectively joining together the second end 52 of the adaptor 10 and a corresponding end of the buoyant float member 20.

In the example illustrated, the second attachment means 54 comprises threaded attachment means, including a male exteriorly threaded portion 56 carried by the second end 52 of the adaptor 10 and a corresponding interiorly threaded female receiver portion, indicated at 58, carried by the buoyant float member 20. However, this is merely illustrative of one exemplary form which said second attachment means 54 may take, but it is not to be construed as specifically limiting same to this representative exemplary arrangement and construction.

It should be clearly noted that the important feature of the adaptor 10 is the fact that the second end 52 thereof is effectively downwardly displaced relative to the first end 32 thereof, whereby to cause the buoyant float member 20 to be correspondingly normally downwardly displaced from a conventional at-rest location, such as that shown in broken lines at the upper water level location 60 of FIG. 1, downwardly to the solid line lower normal water level location indicated by the surface 34 of the water designated by the reference numeral 36. The effective downward displacement of the second end 52 relative to the first end 32 in the example illustrated is provided by the inclusion of an intermediate downwardly offset portion 62 of the adaptor 10, which effectively displaces the entire second end 52 correspondingly downwardly from the entire first end 32 thereof by an amount determined by the magnitude of said intermediate downwardly offset portion 62. This, of course, may be originally designed in a manner such as to produce a lowering of the water level which is thought to be suitable for the particular water-saving purposes of the present invention while still providing adequate flushing capability for a toilet to which the toilet flush tank 12 is adapted to be connected in the conventional gravity-flushing manner.

The operation of the exemplary first form of the invention is believed to be apparent from the showing of the figures of the drawing and the foregoing description. However, a very brief summary thereof will be provided immediately hereinafter in order to make the water-saving operation of the apparatus completely clear.

When it is desired to flush a toilet to which the main discharge valve 22 is connected in the conventional gravity flushing manner, the flushing handle 26 is rotated or otherwise operated in a manner which will lift the valve stem 64 of the main discharge valve 22 so as to lift the elastomeric valve member 66 off of the tapered valve seat 68 for either a predetermined period of time or for that period of time required for the downward return of the valve member 66 from its temporarily elevated flushing position into an engagement position with the valve seat 68. This is normally arranged so that it will not occur until after the entire volume of water 36 contained in the flush tank 12 has been quickly emptied, under the action of gravity, downwardly through the open valve seat 68 of the main flushing and discharging valve 22. This rapid discharge of the volume of water previously contained in the flush tank 12, normally causes a complete flushing action to occur in a toilet bowl or receptacle to which the main discharge and flushing valve 22 is connected.

As soon as the tank 12 has been emptied and the valve member 66 has again become re-engaged with the valve seat 68 and it can be said that the main discharging and flushing valve 22 is again closed, it is now possible for the tank 12 to be refilled, which operation has already begun just as soon as the water level 34 within the flush tank 12 was lowered during the preceding flushing operation. This occurs by reason of the fact that the lowering of the top surface 34 of the water allows the buoyant float member 20 to move downwardly and to effectively move the inlet valve operating member 18 downwardly from its previously closed condition into an open condition. The refilling operation will then continue until the rising top surface level 34 of the water 36 again reaches the predetermined level 40 of FIG. 1 which will correspond to that level where the valve operating arm 18 reaches a valve-closing position, at which point, the inlet valve 16 will again be turned off and no more water will flow into the tank 12 and all of the interior apparatus within the tank 12 will become inoperative and quiescent awaiting the next flushing operation.

It is clear that the magnitude 62 of the vertical offset portion of the adaptor 10 has, in effect, correspondingly reduced the total volume of water 36 discharged during one complete valve flushing operation, thus providing a substantial saving of water inasmuch as many conventional prior art valve flushing operations have discharged between 3 and 7 gallons during each such flushing operation.

It may be desirable in many circumstances to provide an arrangement where the modification of the amount of water which will be discharged during each flushing operation can be manually adjusted to correspond to particular circumstances and needs. One such arrangement is illustrated in FIG. 4, wherein the adaptor 10a is provided with manual adjustment means, indicated generally at 69, which, in the example illustrated, comprises two relatively vertically slidably, telescopically engageable adjustment portions 70 and 71 for adjusting the vertical magnitude of the entire intermediate portion 62a. This is facilitated by the provision of locking means taking the form of set screw means 72 adapted to extend through a tapped aperture in the sleeve-shaped telescopic member 71 for locking abutment with the other inserted rod-shaped telescopic member 70. This makes it possible to adjust the vertical magnitude of the displacement in the manner clearly indicated by the broken line increased displacement portion of the first end 32a shown in FIG. 4. Of course, it is to be understood that normally the manual adjustment means 69 will be located in a mid-range position so that the vertical extent thereof may be either increased or decreased as desired, after which it may be locked by the set screw means 72, thus controlling the volumetric capacity of the water discharged during each flushing operation.

FIG. 5 clearly illustrates the fact that the manual adjustment means 69 in the vertical off-set portion 62a is provided with water volume selector and indicator means, designated generally by the reference numeral 73, which makes it possible to select any desired degree of downward displacement of the second end 52a relative to the first end 32a and to correspondingly select any desired modification of the total amount of water which will be dispensed in any one flushing operation. The water volume selector and indicator means 73 is illustrated in a form wherein it includes scale means 75 carried by the rod member 70 and functional index means 77 carried by the hollow receiver member 71 of the two vertically, slideably, adjustable portions. The index 77 merely comprises the top edge of the hollow receiver 71 which when aligned with any of the scale markings 75 indicates the extent of reduction or modification of the total water volume which will be flushed which has been achieved by the manual adjustment means 69 and the water volume selector and indicator means 73. Of course, it should be understood that the structure illustrated in FIG. 5 is exemplary only and that any other functional equivalent may be employed in lieu thereof and all such are intended to be included and comprehended within the broad scope of the present invention. Corresponding parts of the FIG. 4 modification are designated by similar reference numerals followed by the letter "a", however, and apart from the portion already described, the remainder thereof is constructed substantially the same as, and functions substantially the same as the first form of the invention illustrated in FIGS. 1, 2, and 3 and described in considerable detail hereinabove. Therefore, no further detailed description of the FIG. 4 slight modification is thought to be necessary or desirable.

FIG. 6 illustrates a further slight modification and corresponding parts are, therefore, designated by similar reference numerals followed by the letter "b", however. In this modification, the major difference from the first form of the invention is that the lower or second end portion 52b is effectively transversely adjustable relative to the first end 32b by the provision of second manual adjustment means, indicated generally at 74, and of a construction very similar to the first-mentioned vertical manual adjustment means 69 of FIG. 4. In the case of the transversely directed second adjustment means 74, it is shown as comprising slidably telescopically engageable adjustment portions 76 and 78, with the portion 78 being of sleeve-like construction, while the portion 76 is of an inserted rod-like construction, and with both being relatively lockable with respect to each other by the provision of set screw means, indicated at 80, in a manner substantially identical to the locking of the vertical adjustment means 69 by its set screw means 72. The arrangement is such that the two ends (the first end 32b and the second end 52b) are relatively transversely adjustable with respect to each other, but in the manner clearly shown in broken lines in FIG. 6. This makes it possible for the adaptor 10 to be sold in the form of a kit suitable for mounting in any of a variety of different sizes of toilet flush tanks, which may have interior flushing mechanisms slightly different in configuration, location and/or spacings. In other words, the whole purpose of the transverse adjustment means 74 of FIG. 6 is to make it possible to adjust the location of the second end 52b, which will be (providing optimum positioning of the float member) attached to a buoyant float member, such as that shown at 20 of the first form of the invention, for optimum cooperation with different types of toilet flush tanks and interior flushing mechanisms. In certain cases, it may be desirable to extend the spacing to provide an optimum location of such a buoyant float member, and in other cases, it might be desirable to shorten the spacing for the same purpose. This will facilitate the location of such a buoyant float member at a place within a toilet tank where it will not obstruct or be likely to strike or interfere with any of the other portions of the operating mechanisms or the toilet flush tank itself.

FIG. 7 merely illustrates fragmentarily a very slight modification of the attachment means for attaching the first end 32c of the adaptor 10c to an inlet valve operating arm, such as that shown at 18 in the first form of the invention. In this slight modification it takes the form of a threaded means 82 intended for cooperation with a corresponding mating threaded portion adapted to be carried inside of an operation arm receiver such as that shown at 48 in FIG. 1 illustrating the first form of the invention. Of course, in this modification, the use of a set screw is entirely optional and may be eliminated if desired. The remaining portions of this modified form of the invention are designated by similar reference numerals, followed by the letter "c", however.

FIG. 8 is a view similar to FIG. 7, but merely illustrates the same concept of a variant form of the attachment means, but in this case, illustrates the variant attachment means as being for attachment of a buoyant float member 20d with respect to the second end 52d of the adaptor 10d. In this modification, it will be noted that the threaded engagement, shown at 54, 56 and 58, of the first form of the invention is effectively replaced with a receiver and set screw attachment arrangement similar to that illustrated at the left end of the adaptor 10 in the first form of the invention and in this case including the receiver 84 and the set screw 86 adapted to be firmly lockingly attached to said second end 52d of the adaptor 10d. This is merely in lieu of the threaded arrangement of the first form of the invention and is intended to indicate the fact that either or both of the attachment means may be modified in the manner indicated, or in any other substantially functionally equivalent manner within the broad scope of the present invention, and that all such arrangements are intended to be included and comprehended herein.

While in a preferred form, the adaptor 10 is made of metal rod stock, appropriately formed so as to have the desired vertical displacement, it should be clearly understood that it may be made of plastic or any other suitable material and need not be of solid rod stock configuration, but may be of hollow tubular configuration if desired, and need not necessarily be round in cross-section. Also, various means for effectively and substantially non-rotatively locking the first end portion 42 thereof with respect to the inlet valve operating member 18 so that the vertical displacement portion 62 will always be maintained in a vertical plane, may be employed in lieu of the specific set screw and keyed or flatted arrangement illustrated, and it should further be understood that, in any of the threaded arrangements, the threads are either arranged, or auxiliary rotative adjustment means are provided, so that vertical displacement of the intermediate offset portion 62 will lie in a substantially vertical plane when the attachment means is in fully attached, locked relationship. It is, of course, also possible that the adaptor 10 be soldered, welded, cemented, bonded or otherwise cohesively, adhesively or mechanically fastened in place rather than to employ readily disengageable attachment means of any of the types illustrated, and all such arrangements are intended to be included and comprehended within the broad scope of the present invention.

It should be understood that the figures and the specific description thereof set forth in this application are for the purpose of illustrating the present invention and are not to be construed as limiting the present invention to the precise and detailed specific structures shown in the figures and specifically described hereinbefore. Rather, the real invention is intended to include substantially equivalent constructions embodying the basic teachings and inventive concept of the present invention.

What is claimed is:

1. A water-saving float-to-inlet valve adapter device for modifying the refilling level of a toilet flush tank of a type which includes a source of water under pressure and an inlet valve provided with an operating member for connecting same to an interior chamber within a toilet flush tank and which also includes a buoyant float member adapted to be connected to the inlet valve for opening same whenever the float member drops below a predetermined level and for closing same whenever the float member rises to at least substantially the same predetermined level, comprising: a replacement adapter having a first end adapted to be attached to an inlet valve opening and closing operating member and having a downwardly displaced second end remote from said first end and adapted to be attached to a buoyant toilet tank float member at a level substantially below that of the normal attachment location of such a toilet tank buoyant float member, whereby to effectively relatively downwardly displace the normal vertical position of such a hollow buoyant float member which corresponds to the closing of such an inlet valve and thus causes a toilet flush tank to refill only partially to a lower level than has been the customary practice with a conventional attachment arm adapted to conventionally substantially transversely interconnect such a buoyant float member and such an inlet valve operating member, said effective downward displacement of said second end of said replacement adapter relative to said first end thereof being provided by an intermediate downwardly offset displacement portion of said adapter effectively displacing the entire second end correspondingly downwardly from the entire first end thereof by an amount determined by the magnitude of said intermediate downwardly offset displacement portion, said intermediate downwardly offset displacement portion of said replacement adapter being further provided with manual adjustment means and thereby being controllably manually adjustable whereby to correspondingly modify the normal valve closing position of a buoyant float member adapted to be attached to the second end thereof and to similarly correspondingly modify the normal water refilling level within a toilet flush tank, said manual adjustment means comprising two relatively vertically slideably engageable adjustment portions and locking means for controllably locking same in any relatively vertically adjusted position; and water volume selector and indicator means effectively cooperable with respect to a portion of said replacement adapter carrying said second end and perceptibly indicating a selected extent of said magnitude of the vertical displacement of said second end relative to said first end and correspondingly perceptibly indicating a selected modified vertical position which a buoyant float member adapted to be attached to said second end will assume when in a normal valve closing position and thus correspondingly indicating a selected modified normal water refilling level within a toilet flush tank, said water volume selector and indicator means being effectively interconnected by said two relatively vertical slideably engageable adjustment portions of said manual adjustment means and including scale means and relatively moveable index means cooperable with said scale means for providing a perceptible indication of said relative vertical adjustment of said two vertically slideably engageable adjustment portions.

2. A water-saving float-to-inlet valve adapter device as defined in claim 1, wherein said effective downward displacement of said second end of said replacement adapter relative to said first end thereof is provided by an intermediate downwardly offset displacement portion of said adapter effectively displacing the entire second end correspondingly downwardly from the entire first end thereof by an amount determined by the magnitude of said intermediate downwardly offset displacement portion.

3. A water-saving float-to-inlet valve adapter device as defined in claim 2, wherein said intermediate downwardly offset displacement portion of said replacement adapter is provided with manual adjustment means and thereby is controllably manually adjustable whereby to correspondingly modify the normal valve closing position of a buoyant float member adapted to be attached to the second end thereof and to similarly correspondingly modify the normal water refilling level within a toilet flush tank.

4. A water-saving float-to-inlet adapter device as defined in claim 3, wherein said manual adjustment means comprising two relatively vertically slidably engageable adjustment portions and locking means for controllably locking same in any relatively vertically adjusted position.

5. A water-saving float-to-inlet valve adapter device as defined in claim 1, wherein said two relatively vertically slideably engageable adjustment portions are telescopically engaged and wherein said locking means for controllably locking same in any relatively vertically adjusted position comprises set screw locking means.

6. A water-saving float-to-inlet valve adapter device as defined in claim 1, wherein said replacement adapter is provided with effectively transversely directed adjustment means for adjusting the relative transverse separation between said first and second ends thereof and correspondingly for adjusting the transverse spacing which would exist between an inlet valve and a buoyant float member when interconnected by said transversely adjustable replacement adapter.

7. A water-saving float-to-inlet valve adapter device as defined in claim 6, wherein said transversely directed adjustment means comprises two slidably engageable transversely relatively adjustable members provided with locking means for controllably locking same in any selected relatively transversely adjusted locked engagement relationship.

8. A water-saving float-to-inlet valve adapter device as defined in claim 6, wherein said transversely directed adjustment means comprises two slidably telescopically engageable transversely relatively adjustable members provided with set screw locking means for controllably locking same in any selected relatively transversely adjusted locked engagement relationship.

9. A water-saving float-to-inlet valve adapter device as defined in claim 1, including attachment means cooperable with said adapter for attaching same to an inlet valve opening and closing operating member taking the form of an operating receiver member, and further including attachment means cooperable with said second end of said adapter for attaching same to a buoyant toilet tank float member.

10. A water-saving float-to-inlet valve adapter device as defined in claim 1, including a toilet flush tank having a hollow interior chamber adapted to normally be filled with water to a predetermined, relatively high level refilling location, said flush tank being provided with an inlet pipe connected to a source of water under pressure and extending into the hollow interior chamber and there being provided with an openable and closeable inlet valve having a transversely extending operating member effectively defining an operating receiver member normally adapted to be connected to a conventional, substantially transversely directed float member attachment arm, and further being provided with a buoyant float member normally adapted to be remotely and operably connected relative to said operating receiver member by the provision of a replaceable transversely directed attachment arm for causing the movement of said operating receiver member upwardly for closing said inlet valve in response to the refilling of the interior chamber with water after a flushing operation has been completed and a main discharge flush valve has been closed, and operable for moving the operating receiver member downwardly in a manner opening the inlet valve in response to the lowering below said predetermined normal level of water within the flush tank chamber as a consequence of the temporary flushing opening of the main discharge flush valve.

11. A water-saving float-to-inlet valve adapter device as defined in claim 3, including water volume selector and indicator means effectively cooperable with respect to a portion of said replacement adapter carrying said second end and perceptibly indicating a selected extent of said magnitude of the vertical displacement of said second end relative to said first end and to correspondingly perceptively indicating a selected modified vertical position which a buoyant float member adapted to be attached to said second end will assume when in a normal valve closing position and thus correspondingly indicating a selected modified normal water refilling level within a toilet flush tank.

12. A water-saving float-to-inlet valve adapter device as defined in claim 4, including water volume selector and indicator means effectively cooperable with respect to a portion of said replacement adapter carrying said second end and perceptibly indicating a selected extent of said magnitude of the vertical displacement of said second end relative to said first end and to correspondingly perceptively indicating a selected modified vertical position which a buoyant float member adapted to be attached to said second end will assume when in a normal valve closing position and thus correspondingly indicating a selected modified normal water refilling level within a toilet flush tank, said water volume selector and indicator means being effectively interconnected by said two relatively vertical slideably engageable adjustment portions of said manual adjustment means and including scale means and relatively moveable index means cooperable with said scale means for providing a perceptible indication of said relative vertical adjustment of said two vertically slideably engageable adjustment portions.

* * * * *